Patented Feb. 26, 1952

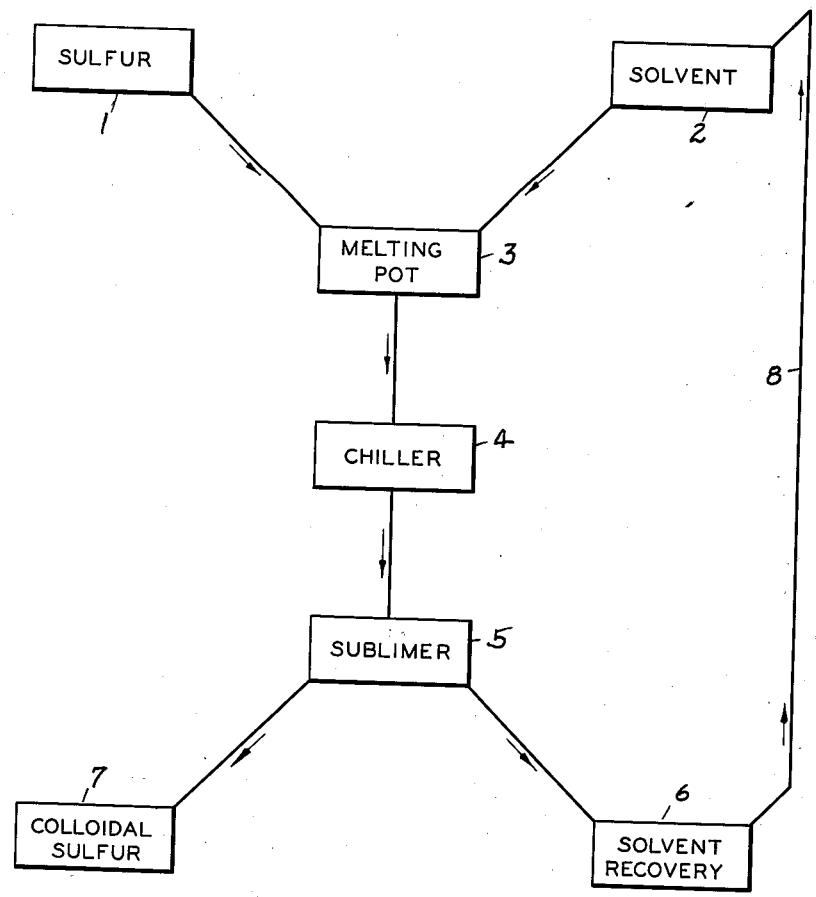

2,586,914

UNITED STATES PATENT OFFICE 2,586,914

COLLOIDAL SULFUR

Samuel C. Carney, Bartlesville, Okla., assignor to Phillips Petroleum Company, a corporation of Delaware Application May 5, 1949, Serial No. 91,535

9 Claims. (Cl. 23—224)

This invention relates to the production of finely divided sulfur. In one of its more specific aspects it relates to a method for the preparation of sulfur of colloidal particle size. In a still more specific aspect it relates to wettable colloidal sulfur having a high static charge as a product of manufacture and a method for producing such sulfur.

An object of my invention is to devise a method for the production of sulfur of colloidal particle size. Another object of my invention is to provide a method for the production of sulfur of colloidal particle size easily wetted with water. Yet another object of my invention is to provide a method for the production of sulfur in a form suitable for pharmaceutical and agricultural uses. Other objects and advantages of my invention will be realized by those skilled in the art upon reading the following disclosure which taken in conjunction with the attached drawing forms a part of this specification.

Colloidal sulfur may be prepared by dissolving sulfur in molten champhor, chilling the melt and subliming the camphor. This sulfur, while colloidal in size is not easily wettable with water and possesses no static charge.

The term "sublimation" as used throughout this specification and claims is intended to include the evaporation step. As, for example, to sublime para dichlorbenzene includes only passage of the para dichlorbenzene directly from the solid state into the vapor state.

I have discovered that sulfur of colloidal particle size may be produced by dissolving sulfur in liquid para dichlorbenzene, chilling the solution to a temperature below its freezing point and subliming the para dichlorbenzene. Sulfur in a form of flowers of sulfur, brimstone or other form in which sulfur may be available may be stored in a bin 1 as illustrated in the drawing. The para dichlorbenzene from a run storage container 2 is transferred to the "melting pot" 3. In this melting pot the para dichlorbenzene is heated to a temperature above its melting point. The sulfur from its storage bin is added to the molten para dichlorbenzene in the melting pot and the mixture agitated until the sulfur is entirely dispersed throughout the para dichlorbenzene as a dispersion medium. After the contents of the melting pot are homogeneous, that is, the sulfur completely dissolved or dispersed in the liquid para dichlorbenzene, the melt is passed to a chilling apparatus 4. This chiller may be a water cooled roller of conventional type or it may be any other chilling apparatus suitable for the purpose at hand. After the melt is chilled and solidified, the material is transferred to a "sublimer" 5. In this sublimer the relatively volatile para dichlorbenzene is sublimed from the sulfur. The sublimed para dichlorbenzene is passed to the apparatus 6 termed "solvent recovery" while the sulfur remains as a solid residue and this material accumulates in the apparatus 7, termed "colloidal sulfur." The para dichlorbenzene is, of course, recovered in the solvent recovery apparatus and may be transferred by conduit 8 to the run storage apparatus 2. The para dichlorbenzene so recovered is, of course, suitable for reuse.

The melting pot apparatus 3 may be any suitable type of apparatus desired. It may be a small pot-like vessel or a large vat or other container suitable for the purpose of producing a liquid solution or suspension of sulfur in para dichlorbenzene. This melting pot apparatus 3 may, of course, be of a continuous type if it is desired to practice my process as a continuous operation. The melting pot may be equipped with steam coils for furnishing heat for melting of the para dichlorbenzene or the vessel may be heated from such a source of heat as, for example, a fire box provided with burners. The use of steam coils, however, is preferred.

The "chiller" apparatus 4 may be of any suitable type as, for example, water cooled rollers or other chilling apparatus suitable for rapid freezing of the para dichlorbenzene melt. If rolls are used for chilling and freezing of the melt, a scraper should be provided for removing adhering material.

The "sublimer" 5 may be most any type of evaporator desired and it must provide heat to heat the congealed para dichlorbenzene-sulfur mixture to a temperature below its melting point. Vacuum may be applied to the sublimer to expedite removal of para dichlorbenzene. If desired, a vapor entraining agent such as steam or an inert gas may be passed through the sublimer for reducing the partial pressure of the para dichlorbenzene vapor to speed up the sublimation operation. The "solvent recovery" apparatus 6 is an apparatus for condensation and recovery of the para dichlorbenzene vapors originating in the sublimer. The recovered solid para dichlorbenzene from the solvent recovery apparatus is transferred by a conduit means 8 such as a belt conveyor, a screw conveyor or other apparatus, from the run storage container prior to the run storage container 2. The colloidal sulfur recovered is then ready for packaging, for storage prior to shipment or for immediate use, as desired.

In the operation of the process of my invention, solid para dichlorbenzene from its run storage 2 is transferred to the melting pot 3 and heated therein until fully melted. A quantity of, for example, brimstone sulfur from bin 1 is added to the molten para dichlorbenzene in the melting pot. However, if desired, the solid para dichlorbenzene and the solid sulfur may be introduced to the melting pot and then melted. Agitation means may be provided for stirring the contents of the melting pot during the melting and sulfur dissolving operation. After the melt becomes homogeneous, the liquid material is then congealed by dropping or spraying on the chiller. A scraper may be provided to remove the congealed melt from the chiller. The material then passes to the sublimer to which heat is supplied and a vapor entrainer such as steam is added to reduce the partial pressure of the para dichlorbenzene. Upon applying a vacuum to the sublimer, the para dichlorbenzene vapors and steam are removed and passed to the para dichlorbenzene recovery step in which the para dichlorbenzene is condensed from the vapors and the steam passed to some disposal. The residual colloidal sulfur removed from the sublimer upon completion of the sublimation operation is ready for use or packaging prior to shipment as stated above.

The proportions of sulfur used with a given quantity of para dichlorbenzene may be varied within wide limits. Small proportions of sulfur, as for example, 1%, yields colloidal sulfur of good quality but plant production is of course limited. The other extreme is limited by the solubility or dispersibility of sulfur in para dichlorbenzene. When too large a proportion of sulfur is used relative to the para dichlorbenzene, the resulting sulfur may contain some particles larger than colloidal particles. In the following example I used 30% by volume of sulfur.

By the term "dispersion" applicant intends to include molecular dispersion as well as colloidal dispersion. By "molecular dispersion" I intend to convey the thought of a true solution, that is, a dispersion of one species of molecules among another species of molecules. By colloidal dispersion is meant the dispersion of small particles or agglomerates composed of many molecules in a suspending medium. A suspension of solid or liquid sulfur particles of one micron and less in diameter in para dichlorbenzene may be termed a colloidal suspension or dispersion of sulfur in para dichlorbenzene. To have a colloidal dispersion of sulfur in liquid para dichlorbenzene, the para dichlorbenzene must first be saturated at the existing temperature with sulfur, then additional sulfur may be colloidally dispersed in this saturated solution.

*Example*

As a specific example of the process of my invention, I melted a quantity of para dichlorbenzene and added 30% by volume of sulfur. Heating of the mass was continued until all of the sulfur had become dispersed in true solution or as a colloidal suspension or both in the para dichlorbenzene. The melted material was then poured drop-wise onto the surface of a cool metal plate. Congealing or freezing was immediate. This congealed material was then removed from the cooling surface and placed in an open container for sublimation of the para dichlorbenzene. After standing a sufficient length of time only sulfur remained. This sulfur was found to be of about 1 micron and less in size, to possess a high static electric charge and to be easily wettable with water. This sulfur was relatively white in color, which color is an indication of the relative degree of the subdivision of the particles.

I have found that the whiter the sulfur, the finer is its degree of subdivision.

As mentioned, sulfur produced by my process is easily wetted by water and this sulfur may be termed "hydrophilic." Since this sulfur is so hydrophilic in nature, it easily disperses in water and may be very useful as a component of agricultural sprays. Since the sulfur is so extremely finely divided it may likewise be useful as an agricultural dusting powder and due to its high static charge, may adhere to plant foliage. My sulfur is also useful in the preparation of pharmaceutical salves, ointments and the like. Since the reactivity or effectiveness of a material frequently increases with its degree of subdivision, my colloidal sulfur may be very effective in many applications.

The para dichlorbenzene may be melted or may not be melted prior to the addition of the sulfur. Whether the sulfur is added to the solid para dichlorbenzene or to melted para dichlorbenzene appears to be immaterial, the points of importance being that the sulfur must ultimately be completely dispersed as a true solution or as a colloidal dispersion or both in the para dichlorbenzene. I use the term "true solution of sulfur in para dichlorbenzene" as being synonymous with the term "molecular dispersion of sulfur in para dichlorbenzene." It will be obvious that to have a colloidal dispersion of sulfur in para dichlorbenzene, the liquid para dichlorbenzene must first be saturated with sulfur and then the amount of sulfur over that required for saturation may be in a truly colloidal form.

As mentioned hereinbefore, colloidal sulfur may be prepared by dissolving in molten camphor and subliming the camphor. However, the sulfur produced by this method is not so easily wetted with water, hence it may find little application as an ingredient in agricultural sprays. Also since it possesses no static electric charge, this sulfur may find little application as an agricultural dusting powder.

Colloidal sulfur prepared by the process of my invention is easily wetted with water and may be easily incorporated in agricultural sprays using water as a carrier. The high static charge possessed by my sulfur is believed to be a very important property when the sulfur is applied as a dust to foliage since the static charge may assist in making the sulfur adhere to the plant leaves and stems.

It will be obvious to those skilled in the art that many variations of my process may be practiced as, for example, varying the proportion of sulfur and para dichlorbenzene melted together or varying the temperature to which the melt is raised, or varying the temperature of chilling or even the sublimation step may be practiced under vacuum with or without a vapor entrainer, and yet remain within the intended spirit and scope of my invention.

Having disclosed my invention, I claim:

1. A method for the production of hydrophilic colloidal sulfur having a high static charge comprising dispersing sulfur in molten para dichlorbenzene, chilling the dispersion to a temperature below its congealing point, subliming the para dichlorbenzene and recovering the colloidal sulfur.

2. A method for the production of hydrophilic colloidal sulfur having a high static charge comprising melting a mixture of sulfur and para dichlorbenzene, chilling the molten mixture to a temperature below its freezing point, subliming the para dichlorbenzene and recovering the colloidal sulfur.

3. The method of claim 2 wherein the sublimation step is carried out in the presence of a vapor entrainer.

4. A method for the production of hydrophilic colloidal sulfur having a high static charge comprising dissolving sulfur in para dichlorbenzene at a temperature above the melting point of the para dichlorbenzene, chilling the solution to a temperature below its freezing point, subliming the para dichlorbenzene and recovering the colloidal sulfur.

5. A method for the production of hydrophilic colloidal sulfur having a high static charge comprising dissolving sulfur in liquid para dichlorbenzene at a temperature above the melting points of the para dichlorbenzene and of the sulfur, chilling the solution to a temperature below its freezing point, subliming the para dichlorbenzene and recovering the colloidal sulfur.

6. A method for the production of hydrophilic colloidal sulfur having a high static charge comprising admixing solid sulfur with solid para dichlorbenzene, heating this admixture to such a temperature that the sulfur disperses in liquified para dichlorbenzene, chilling the dispersion to a temperature below its congealing point, subliming the para dichlorbenzene and recovering the colloidal sulfur.

7. A method for the production of hydrophilic colloidal sulfur having a high static charge comprising forming a colloidal dispersion of sulfur in liquid para dichlorbenzene, chilling the dispersion to a temperature below its congealing point, subliming the para dichlorbenzene and recovering the colloidal sulfur.

8. A method for the production of hydrophilic colloidal sulfur having a high static charge comprising melting a quantity of para dichlorbenzene by heating the para dichlorbenzene to a temperature of at least its melting point, dispersing a quantity of sulfur in the melted para dichlorbenzene, chilling the dispersion to a temperature below its solidifying point, subliming the para dichlorbenzene and recovering the colloidal sulfur.

9. A method for the production of hydrophilic colloidal sulfur having a high static charge comprising melting a quantity of para dichlorbenzene by heating the para dichlorbenzene to a temperature of at least its melting point, dispersing a quantity of sulfur in the melted para dichlorbenzene, chilling the dispersion to a temperature below but near its solidification point and at this temperature subliming the para dichlorbenzene from the dispersed sulfur and cooling and recovering the colloidal sulfur.

SAMUEL C. CARNEY.

REFERENCES CITED

The following references are of record in the file of this patent:

UNITED STATES PATENTS

| Number | Name | Date |
|---|---|---|
| 2,037,090 | Pough | Apr. 14, 1936 |
| 2,229,917 | Minger | Oct. 27, 1942 |
| 2,316,673 | McDonald | Apr. 13, 1943 |
| 2,345,862 | Smith | Apr. 4, 1944 |
| 2,458,764 | Brunel | Jan. 11, 1949 |